United States Patent
McGinty et al.

(10) Patent No.: US 7,380,809 B2
(45) Date of Patent: Jun. 3, 2008

(54) SYSTEM AND METHOD FOR LOADING A BOAT ON A TRAILER

(76) Inventors: Joseph R. McGinty, 194 Brentwood La., Madison, AL (US) 35758; Donald W. Alford, 123 Sycamore Rd., Gurley, AL (US) 35748

( * ) Notice: Subject to any disclaimer, the term of this patent is extended or adjusted under 35 U.S.C. 154(b) by 356 days.

(21) Appl. No.: 11/171,116

(22) Filed: Jun. 30, 2005

(65) Prior Publication Data

US 2006/0001236 A1    Jan. 5, 2006

Related U.S. Application Data

(60) Provisional application No. 60/584,224, filed on Jun. 30, 2004.

(51) Int. Cl.
*B60P 3/10* (2006.01)

(52) U.S. Cl. .................... 280/414.1; 414/478; 414/479

(58) Field of Classification Search ............. 280/414.1; 414/462, 478, 479
See application file for complete search history.

(56) References Cited

U.S. PATENT DOCUMENTS

| | | | | |
|---|---|---|---|---|
| 3,768,677 A | * | 10/1973 | Moss | 414/476 |
| 4,319,862 A | * | 3/1982 | Cook | 414/471 |
| 4,538,952 A | * | 9/1985 | Chase | 414/458 |
| 4,946,332 A | * | 8/1990 | Daniels | 414/477 |
| 5,000,471 A | * | 3/1991 | Sumrall | 280/414.1 |
| 5,263,733 A | * | 11/1993 | Kastenberger et al. | 280/414.1 |
| 6,257,167 B1 | * | 7/2001 | Joaquim | 114/344 |

* cited by examiner

*Primary Examiner*—Tony H. Winner
(74) *Attorney, Agent, or Firm*—Lanier Ford Shaver & Payne P.C.; Ann I. Dennen (57) ABSTRACT

A system has a boat trailer and a mechanical arm coupled to the boat trailer. The system further has logic that actuates the mechanical arm based upon a user input, such that the mechanical arm applies a pressure to the boat when the boat is positioned for loading onto the trailer.

19 Claims, 11 Drawing Sheets

SYSTEM AND METHOD FOR LOADING A BOAT ON A TRAILER

CROSS-REFERENCE TO RELATED APPLICATIONS

This document claims priority to and the benefit of the filing date of the U.S. Provisional Application No. 60/584,224, entitled "Boat Trailer Docking Clasp," and filed on Jun. 30, 2004, and such application is incorporated herein by reference.

RELATED ART

Recreational boaters often keep their boats on a boat trailer to reduce storage cost. Additionally, storing a boat on a boat trailer provides boaters the flexibility to take the boat to many different locations without considerable effort on the boater's part in loading the boat onto the boat trailer for transport.

In order for a boater to avail himself of these described advantages, the boater transports the boat on the boat trailer to water, unloads the boat from the boat trailer in order to use the boat, then loads the boat back on the trailer to transport it back to its storage location. Unfortunately, boaters routinely go boating alone or with other people who know little about loading and/or unloading a boat from the boat trailer. Hence, the boater often loads and unloads the boat on his own, and this may cause inconvenience and dangerous situations when removing the boat from the boat trailer and returning the boat to the boat trailer, especially in windy or stormy conditions or at night.

Typically, to place a boat on a trailer, the boater temporarily turns the motor off and secures the boat to a stationary object, e.g., a dock, by tying the boat to the object. The boater backs a towing vehicle, e.g., a truck or other vehicle attached to the trailer, into the water, such that the trailer is in a position to receive the boat.

The boater then exits his towing vehicle, returns to the place where the boat is temporarily moored, and releases the boat from the stationary object. Further, the boater gets into the boat, starts the boat motor, and drives the boat into a position aligned with the trailer. He then leaves the boat and moves to the front of the boat. In this regard, the boater may leave the boat motor on or turn it off depending upon the boater's own personal habits.

The trailer typically comprises a "winch," which refers to a hoisting device that is attached to the trailer. The winch comprises a drum around which a rope or a chain is wound. The rope or chain is typically attached to the boat, and the boater actuates a handle attached to the drum that tows the boat into a position necessary for ensuring that when the towing vehicle is driven out of the water, the boat rests on the trailer.

The boat usually comprises, for example, a hook eye for attaching the rope or chain to the boat. Therefore, in order to attach the boat to the trailer, the boater manually pulls the boat to the general area of the winch and attaches the rope or chain to the hook eye. If the boat motor is left running, the boater must get in the boat to secure the motor, then hurriedly get out of the boat to secure the boat onto the trailer while standing in the water.

Once the boat is secured, the boater is left wet. Therefore, the boater may dry his feet before entering the towing vehicle, start the vehicle, and pull the boat out of the water to an empty place to finish lashing the boat down. Oftentimes, due to weather conditions, or at night, several of these steps must be repeated in order to ensure that the boat is securely trailered.

In addition, unloading the boat from the trailer can also be arduous. In this regard, the boater must get out of his towing vehicle to untie the boat from the trailer. He must then get back into his vehicle to back the boat into the water. The boater must then get out of his towing vehicle and release the boat from the winch and drive the boat off the trailer. Once the boat is secured to a dock, for example, the boater must move his towing vehicle out of the water.

SUMMARY OF THE DISCLOSURE

Generally, the present disclosure provides systems and methods for loading and unloading a boat onto a boat trailer.

A system in accordance with an embodiment of the present disclosure comprises a boat trailer and a mechanical arm coupled to the boat trailer. The system further comprises logic configured to actuate the mechanical arm based upon a user input, such that the mechanical arm applies a pressure to a boat when the boat is positioned for loading onto the trailer.

A method in accordance with another embodiment of the present disclosure comprises the steps of driving the boat onto the trailer and automatically actuating a mechanical arm, in response to a user input, the mechanical arm applying pressure to the boat.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for docking a boat onto a boat trailer. In particular, a boat docking device in accordance with the present disclosure is mounted on a boat trailer that is attached to a towing vehicle, e.g., a truck, in such a way as to allow a boat to be driven onto the trailer. The boater then activates the boat-docking device, and the boat-docking device automatically clasps or locks the boat in a position such that when a towing device is driven out of the water, it rests on the trailer. In this regard, the boater is able to load the boat onto the trailer without having to step out of the boat to winch the boat onto the trailer before the boat and trailer are pulled out of the water.

Figure 1:
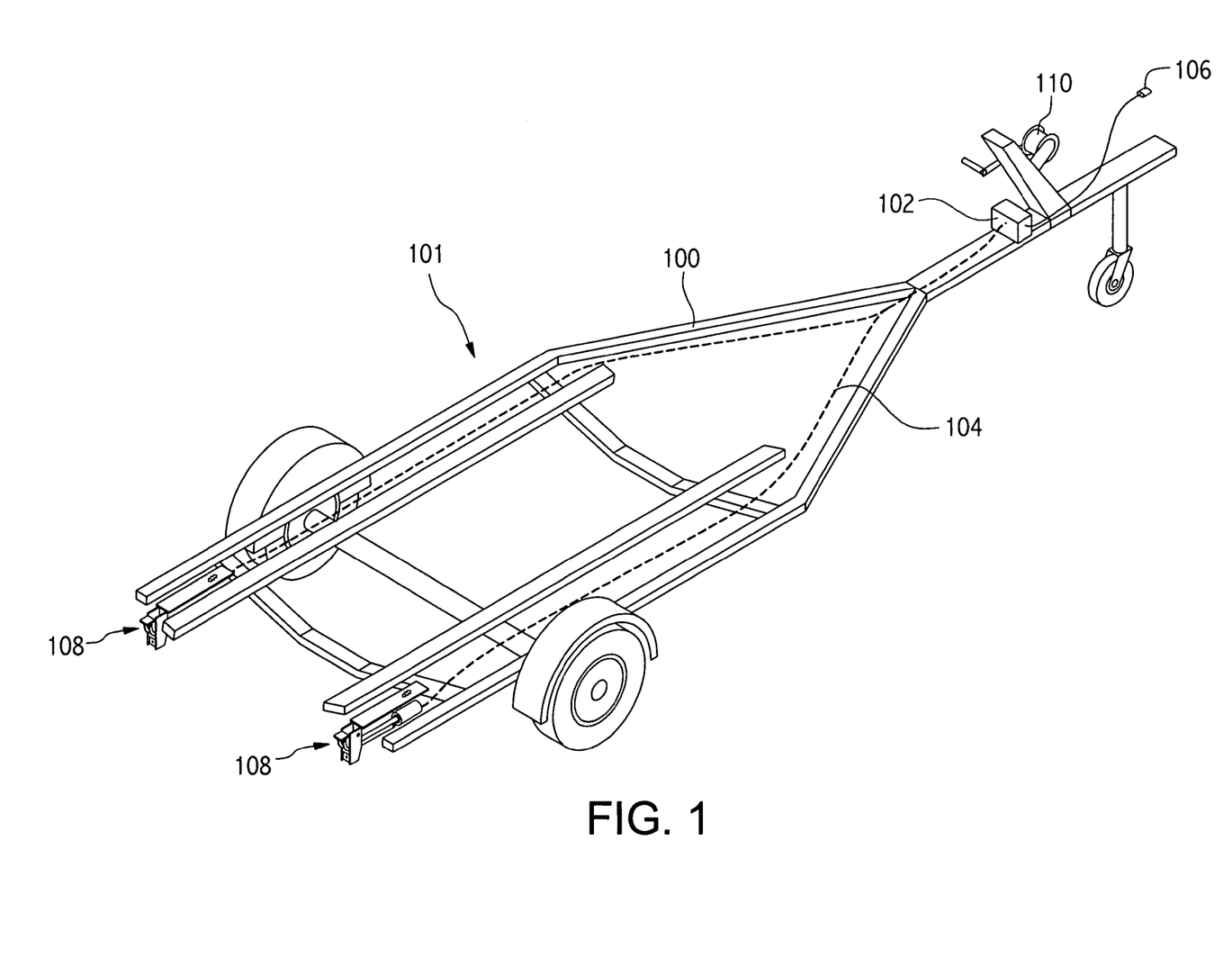
FIG. 1 depicts an exemplary boat-docking device in accordance with the present disclosure attached to a boat trailer.

FIG. 1 depicts a system 101 comprising a pair of docking devices 108 in accordance with an embodiment of the present disclosure. The docking devices 108 are mounted to a boat trailer 100.

Further, the system 101 comprises an electronic controller 102 electrically coupled to a connector 106 and to each of the boat docking devices 108. The controller 102 is electrically coupled to the boat docking devices 108 by a wiring harness 104. The wiring harness 104 and the controller 102 are preferably secured to the trailer 100. The controller 102 is preferably waterproof and comprises a plurality of electronic components, described further with reference to FIG. 16. Generally, the controller 102 controls the docking device 108.

The wiring harness 104 preferably comprises a plurality of electrical connections (not shown), e.g., a plurality of conductive wires. The wiring electrically couples the controller 102 and the docking devices 108. The wiring of the wiring harness 104 is preferably also waterproof.

The connector 106 is a connector known in the art or future-developed for connecting the controller 102 to a power supply (not shown). In one embodiment, the power supply is located on a towing vehicle (not shown), e.g., a truck, and the connector 106 is electrically coupled to the power supply resident on the towing vehicle. Therefore, the controller 102 and the docking devices 108 are provided power via the connector 106 from the power supply on the towing vehicle. For example, the connector 106 may connect to the battery (not shown) of the towing vehicle.

In another embodiment, the power supply (not shown) is located on the boat trailer 100, and the connector is connected to the power supply on the trailer 100, such that the controller 102 and the docking devices 108 are provided power via the connector from the power supply located and/or attached to the boat trailer 100.

In one embodiment, the controller 102 can be controlled by a small, battery powered, hand held electronic device (not shown) designed to issue remote control commands to controller 102, e.g., a radio frequency (RF) transmitter (not shown). In this regard, the docking devices 108 may be controlled remotely by a user (not shown). Such a device may be encoded to uniquely control the controller 102 so that spurious commands from other boaters' devices do not interfere with controlling the controller 102 via the handheld device. Such hand-held devices are known in the art.

In addition to receiving power via the connector 106, the controller 102 further receives activation and deactivation signals via the handheld device, as described hereinabove, or via a manual interface (not shown), such as, for example, a pushbutton interface located on the controller 102. Thus, the handheld device or the controller 102 may comprise a pushbutton that, when selected, signals the controller 102 to engage the docking devices 108 or a pushbutton that, when selected, signals the controller 102 to disengage the docking devices 108.

In one embodiment, the device 108 engages the boat (not shown) by actuating in an upward position so that the device 108 contacts the boat located above and/or in proximity to the trailer 100 such that the boat can later be winched to the trailer 100 when out of the water. Such a position is hereinafter referred to as the "engaged position," and the act of positioning the docking devices 108 as described hereinafter is referred to as "engaging the docking devices 108."

Furthermore, in one embodiment, the device 108 disengages the boat (not shown) by actuating in a downward position so that the device 108 is not longer contacting the boat located above and/or in proximity to the trailer 100 such that the boat can later be driven into the water. Such a position is hereinafter referred to as the "disengaged position," and the act of positioning the docking devices 108 as described hereinafter refers to as "disengaging the docking devices 108."

FIG. 1 depicts the docking devices 108 in the disengaged position. In this regard, when the trailer 100 is submerged in water (not shown), a boat (not shown) might be driven so that it is positioned above the trailer 100 within proximity to the winch 110.

Figure 2:
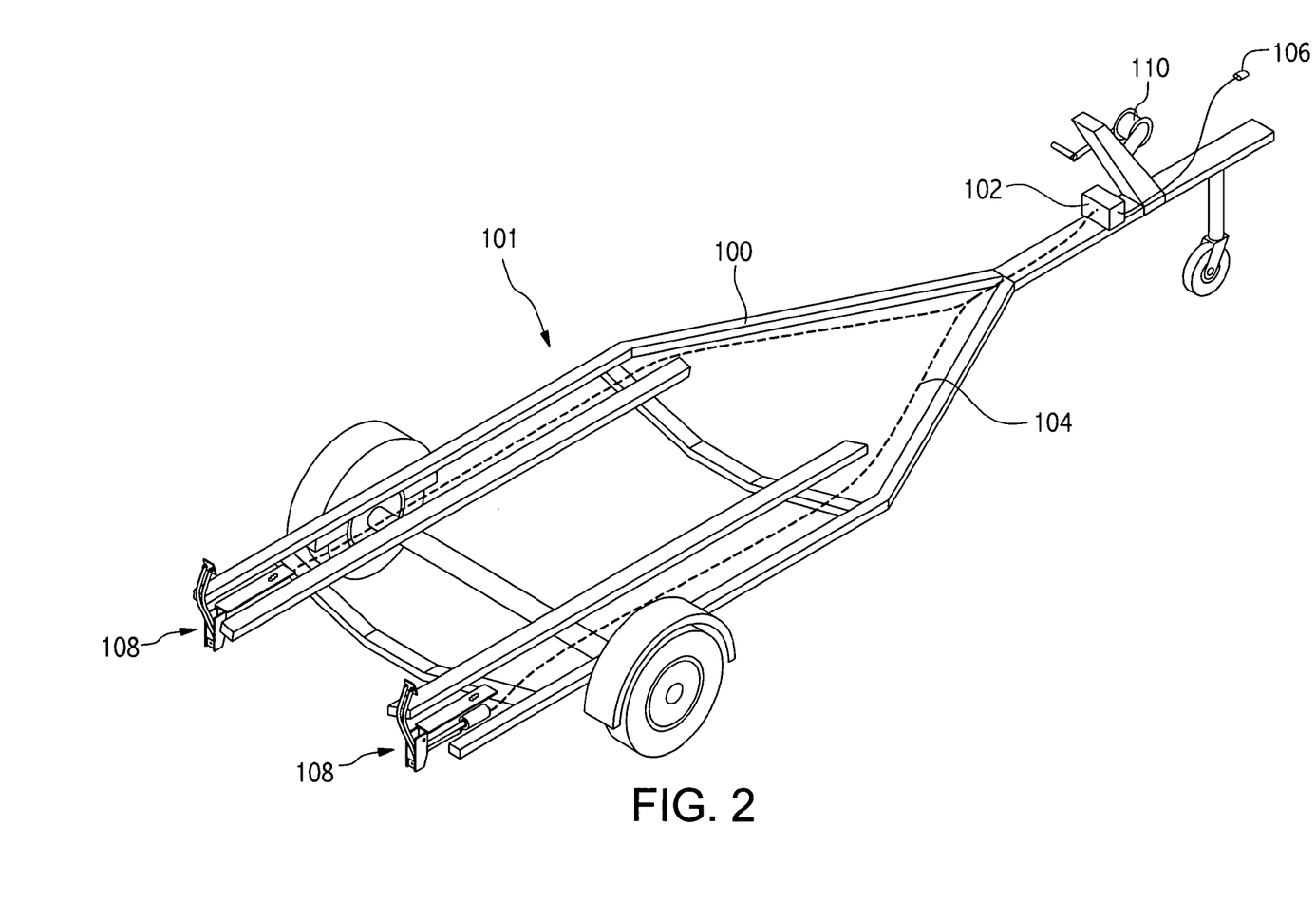
FIG. 2 depicts the docking device depicted in FIG. 1 in an actuated position.

FIG. 2 depicts the system 101 comprising the docking devices 108 in the engaged position, as described herein. In this regard, if the trailer 100 is submerged in water (not shown), a boat (not shown) might be driven so that it is positioned above the trailer 100 within proximity to the winch 110. Once the boat is in proximity to the winch 110, the controller 102 engages the docking devices 108. Such engagement may be effectuated remotely, via a handheld remote control device, or via manual actuation, as described hereinabove.

In this regard, electronics (not shown) within the controller 102 receive an activation signal that commands the controller to engage the docking devices 108. The controller 102 and the electronics therein are described in more detail with reference to FIG. 16. The controller 102 transmits at least some signal to the docking devices 108 that actuates the docking devices, thereby moving them upward into the engaged position as shown in FIG. 2.

Figure 3:
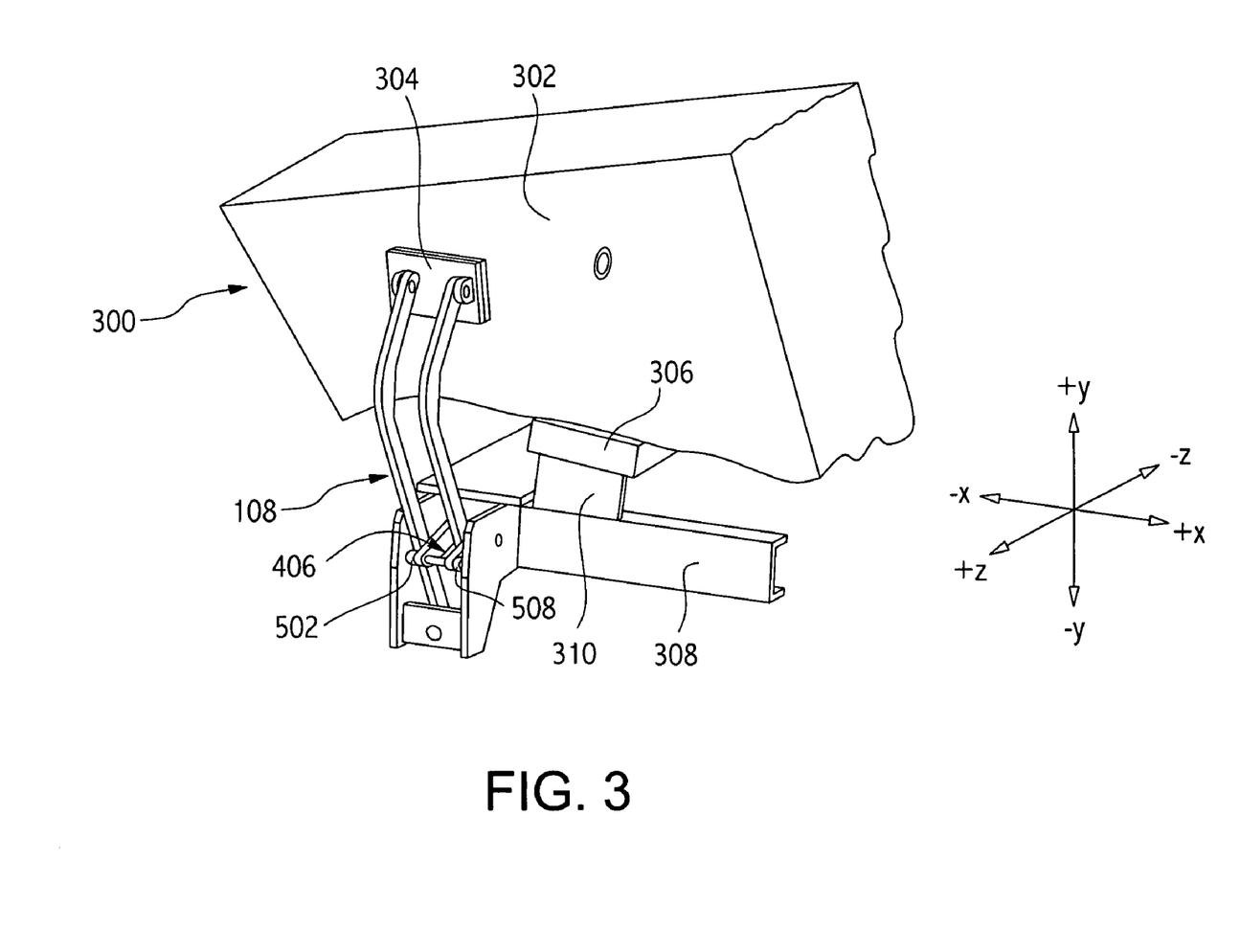
FIG. 3 depicts a perspective view of the docking device depicted in FIG. 1.

FIG. 3 depicts one of the docking devices 108 having a boat pad 304. The docking device 108 is in the engaged position in relation to a boat 300. The docking device 108 is positioned such that the boat pad 304 applies pressure to the boat transom 302 of the boat 300 in the negative z-direction thereby retaining the boat 300 and ensuring the boat's stability.

Furthermore, while the boat 300 is being loaded, it may continue to move with respect to the trailer 100 while the boat 300 is still in the water (not shown) or when the trailer 100 is being pulled from the water. When the boat 300 moves as a result of such described forces, the boat will tend to move with respect to the docking device 108, thereby changing the pressure applied by the docking device 108 on the boat. In response to this change in pressure, the docking device 108 continues to adjust the boat pad 304 so that the pressure applied by the docking device 108 remains substantially constant until the boat 300 is removed from the water. When the boat 300 is removed from the water, the docking device 108 automatically turns off, or the docking device 108 is turned off by the boater (not shown) leaving the boat pad 304 in its indicated position.

Note that in operation two docking devices 108, a left docking device 108 (FIG. 1) and a right docking device 108 (FIG. 1), are mounted to the boat trailer 100 (FIG. 1), as described hereinabove with reference to FIGS. 1 and 2. However, additional or other numbers of docking devices 108 can be used in other embodiments. Further note that the left and right docking devices 108 (FIGS. 1 and 2) work identically. Therefore, for brevity, only operation of one boat-docking device 108 will, in general, be described hereafter.

As shown in FIG. 3, the boat trailer 100 (FIGS. 1 and 2) comprises a running board 306 held in place by board bracket 310. The board bracket 310 allows a boat transom 302 of the boat 300 to rest on the running board 306 when the towing vehicle (not shown) pulls the boat 300 from the water. Note that the "boat transom" refers to the back end of a boat, and the transom is substantially vertical to the water (not shown).

The docking device 108 is attached to a trailer back 308 via any known attachment device, such as, for example, bolts or clamps. The docking device 108 comprises a boat pad 304 that applies pressure to the boat transom 302 when the docking device 108 is in the engaged position. Furthermore, as described hereinabove, the pressure applied to the boat transom 302 is not necessarily constant. In this regard, as the boat 300 moves, thereby applying more or less pressure to the boat pad 304, the docking device 108 adjusts the pressure it applies through the boat pad 304 in accordance with the amount of pressure being applied to the docking device 108 through the boat pad 304.

FIG. 3 depicts the docking device 108 in an engaged position. In this regard, the controller 102 transmits a signal to the docking device 108 to activate engagement of the docking device 108. When activated, the docking device 108 moves the boat pad 304 in a positive y-direction, such that the boat pad 304 eventually contacts the boat transom 304, as shown.

Further, the docking device 108 continues to move the boat pad 304 in the positive y-direction and the negative z-direction until a predetermined threshold value indicative of a pressure being applied to the boat transom 302 is reached. Furthermore, throughout the process of loading the boat 300 and pulling the boat 300 from the water, the docking device 108 continues to monitor the pressure applied to the boat transom 302, and when the pressure increases or decreases below the threshold pressure value, the docking device 108 moves the boat pad 304 in the negative z-direction or the positive z-direction, respectively, in response to the increase and/or decrease in pressure.

In this regard, when the boat 300 is positioned above the trailer 100 while the trailer 100 is still in the water, the waves in the water may cause the boat 300 to move. For example, the boat may move the positive z-direction as a result of a wave. When it moves in the positive z-direction, the transom 302 pushes against the boat pad 304 thereby increasing the pressure that is being applied to the transom 302 by the boat pad 304. Likewise, When it moves in the negative z-direction, the transom 302 moves away from the boat pad 304 thereby decreasing the pressure that is being applied to the transom 302 by the boat pad 304.

Therefore, the system 101 (FIG. 1), via the controller 102 can monitor the pressure that is being applied to the transom 302 via the docking device 108. If the pressure increase and/or decreases, then the controller 102 can cause the docking device 108 to decrease and/or increase pressure being applied, respectively.

As indicated hereinabove, the trailer 100 may comprise two docking devices 108, a right, and a left docking device 108. However, for brevity, the left docking device 108 is shown in FIG. 3. The right and left docking devices 108 shown in FIGS. 1 and 2 operate in like manner.

Figure 16:
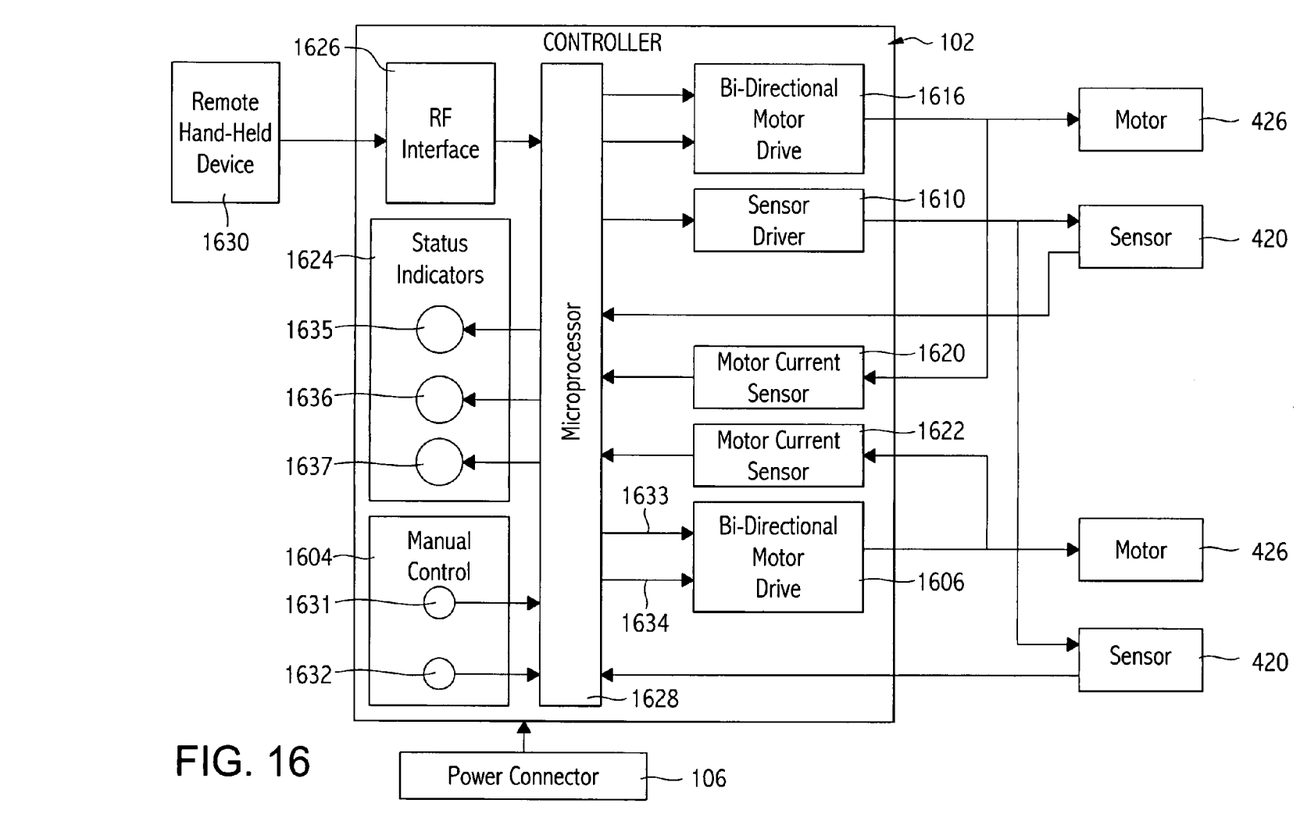
FIG. 16 is a block diagram depicting an exemplary controller for controlling the docking device depicted in FIG. 1.

Furthermore, as indicated herein, the docking device 108 is activated by the controller 102, which is described further herein with reference to FIG. 16. In this regard, the controller 102 transmits a signal that actuates the docking device 108 to the engaged position or to the disengaged position via the wiring harness 104. Such signal may be initiated by a remote device and/or by manual activation, e.g., via a pushbutton on the electronic device 102, as described hereinabove.

Figure 4:
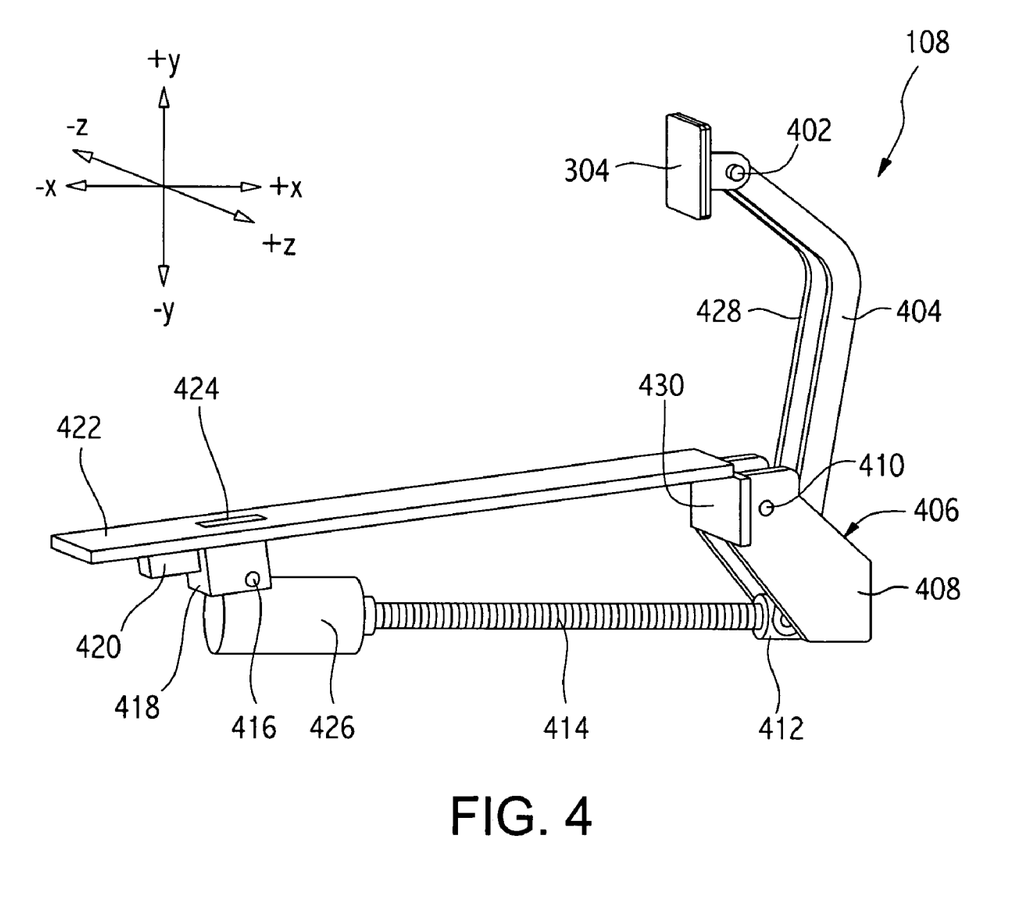
FIG. 4 depicts a side view of the docking device depicted in FIG. 1.

FIG. 4 depicts a perspective view of the docking device 108 in accordance with an embodiment of the present disclosure. The docking device 108 depicted in FIG. 4 is in the engaged position as described hereinabove.

The docking device 108 comprises a mounting plate 422 and a mount surface 430, which mount the docking device 108 to the boat trailer 100, shown in FIGS. 1 and 2. Mounting the docking device 108 to the trailer 100 is described in more detail herein.

The docking device 108 further comprises the boat pad 304 attached to a left main arm 404 and a right main arm 428 via a pad pivot mechanism 402. The pad pivot mechanism 402 allows the boat pad 304 to swing about the pivot mechanism 402 in the positive and negative y-directions. The left main arm 404 and the right main arm 428 are substantially identical, and each is substantially L-shaped, as will be described further herein.

The docking device 108 further comprises an arm mounting bracket 408 that mounts the main right arm 428 and the main left arm 404 to the mounting plate 422. The arm-mounting bracket 408 is coupled to a pressure distribution mechanism 406 (not shown), which is described in more detail with reference to FIG. 5.

The docking device 108 further comprises a jackscrew 414. A "jackscrew" refers to a cylindrical rod incised with one or more advancing spiral threads. Further, the docking device 108 comprises a threaded nut 412 that is threaded on the jackscrew 414. The threaded nut 412 is coupled to the left main arm 404 and the right main arm 428 such that when the threaded nut 412 moves to the engaged position, which is the furthest possible position of the nut 412 from the motor as shown in FIG. 4, the left main arm 404 and the right main arm 428 move in a positive y-direction as the nut 412 moves in the negative x-direction, which is described further herein.

The jackscrew 414 is attached at an end opposing the arm-mounting bracket 408 to a motor 426. The motor 426 is attached to a motor mount 418, and the motor mount 418 mounts the motor to the mounting plate 422 via a slot 424.

Preferably, the motor 426 is a gear driven, submersible electric motor. The motor 426 is attached to the jackscrew 414 such that the output shaft (not shown) of motor 426 turns the jackscrew 414. Such rotating motion may be in a clockwise and/or counterclockwise rotation, depending upon an electrical current direction supplied to the motor 426. The controller 102 (FIGS. 1 and 2) supplies the current to the motor 426 via the wire harness 104 (FIGS. 1 and 2).

As described herein, threaded nut 412 is threadedly coupled to the jackscrew 414. Therefore, when the motor 426 rotates the jackscrew 414, the threaded nut 412 moves linearly in the positive or negative x-direction depending upon whether the jackscrew 414 is rotating in a clockwise or counter-clockwise direction.

Thus, rotation of the jackscrew 414 in the clockwise direction moves the threaded nut 412 in the positive x-direction. When the threaded nut 412 moves in the positive x-direction, the left main arm 404 and the right main arm 428 extend in the positive y-direction so that the boat pad 304 engages the boat transom 302 (FIG. 3).

On the other hand, rotation of the jackscrew 414 in the counter-clockwise direction moves the threaded nut 412 in the negative x-direction. When the threaded nut 412 moves in the negative x-direction, the left main arm 404 and the right main arm 428 protract in the negative y-direction so that the boat pad 304 disengages the boat transom 302 (FIG. 3).

As the main left arm 404 and main right arm 428 move in the positive y-direction as the jackscrew 414 rotates, the boat pad 304, which is attached to the main left arm 404 and main right arm 428 via bolts, rivets, or other attachment device known or future developed, rotates about the pad pivot mechanism 402. Notably, the boat pad 304 is freely attached to the main left arm 404 and main right arm 428 such that boat pad 304 is free to rotate about pad pivot mechanism 402. Therefore, the boat pad 304 evenly applies pressure to the transom 302 (FIG. 3) by aligning the boat pad 304 with the boat transom 302 of boat 300 when the boat pad 304 is pressed against the transom 302, as shown in FIG. 3.

As described hereinabove, the mounting bracket 408 is attached to the pressure distribution mechanism 406, described further herein, and the mounting bracket 408 is attached to the boat trailer 100 securely via bolts (not shown) or other type of attachment mechanism.

Motor 426 is held securely to mounting plate 422 by motor mount 418. Motor mount 418 moves linearly and parallel to the mounting plate 422 as the jackscrew 414 rotates using motor mount slot 424 in the mounting plate 422. When the motor mount 418 moves linearly, pressure applied to the boat pad 304 is transferred mechanically and proportionally to motor mount 418 via the jackscrew 414.

In this regard, the docking device 108 further comprises a pressure sensor 420. The pressure sensor 420 is mechanically coupled to the motor mount 418. Therefore, the pressure sensor 420 senses any pressure transmitted to motor mount 418 as the motor mount 418 moves linearly. Such is described in more detail herein.

Figure 5:
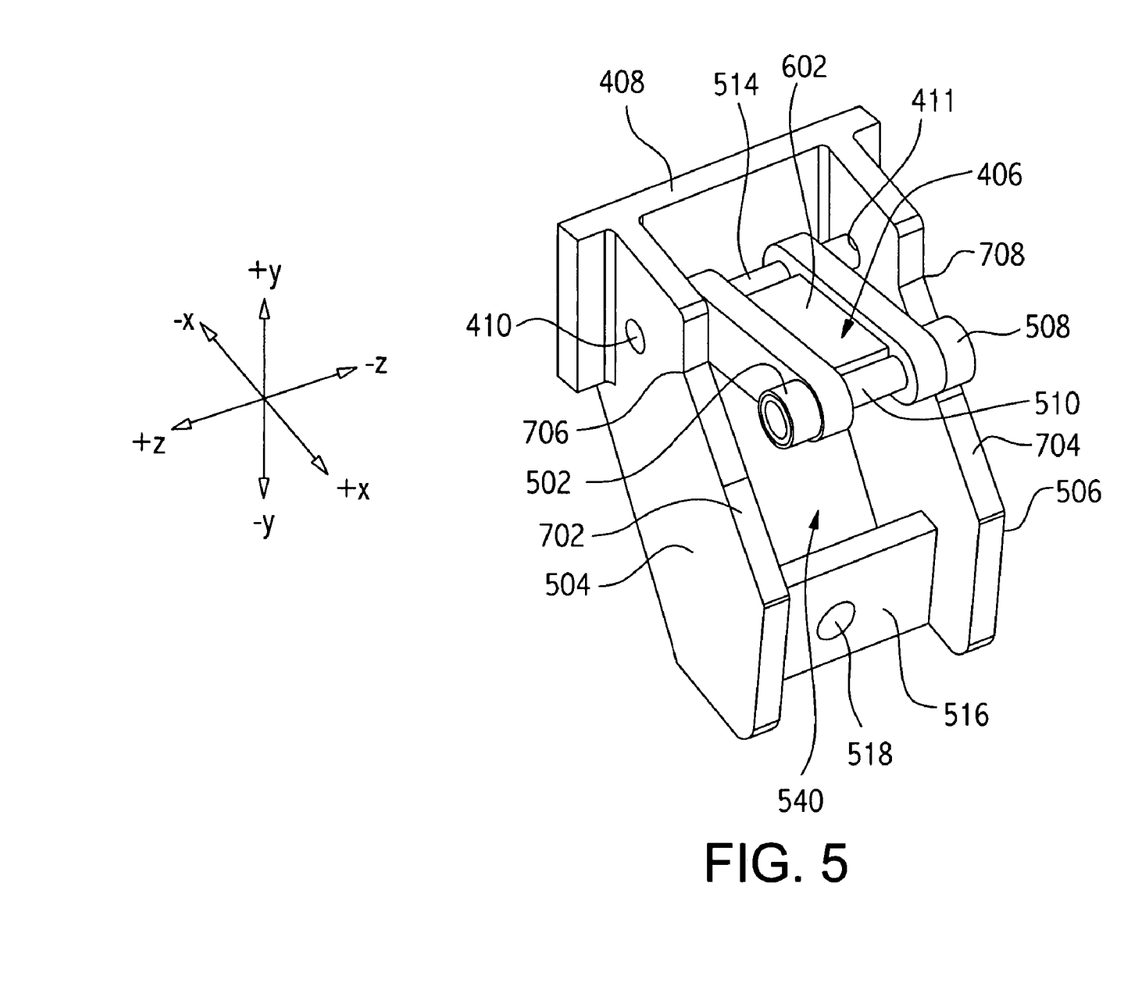
FIG. 5 depicts a perspective view of an exemplary mounting bracket of the boat docking device depicted in FIG. 1.

FIG. 5 depicts a perspective view of the arm-mounting bracket 408 that is coupled to the pressure distribution mechanism 406 (FIG. 4). The pressure distribution mechanism 406 comprises a pressure mechanism shaft 514, a stability block 602, a roller shaft 510, and left and right pressure wheels 502 and 508, respectively.

In this regard, the pressure distribution mechanism 406 is placed within a cavity 540 of the mounting bracket 408. The pressure mechanism shaft 514 is rotatably inserted into the arm mounting bracket openings 410 and 411, and retained when the pressure distribution mechanism 406 is assembled. Thus, the pressure distribution mechanism 406 is free to rotate about the openings 410 and 411 in the positive and negative y-directions.

The roller shaft 510 is not secured to the left and right arm mounting brackets 504 and 506, so that it can freely move in the positive and negative y-directions. The pressure wheels 502 and 508 are rotatably fastened to the roller shaft 510, so that the pressure wheels 502 and 508 can therefore rotate freely.

The arm mounting bracket 408 further has a jackscrew guide bracket 516. The jackscrew guide bracket 516 is attached to the left arm mounting bracket 504 and the right arm mounting bracket 506 securely, for example, by welding the jackscrew guide bracket 516 to the left arm mounting bracket 504 and the right arm mounting bracket 506.

The jackscrew guide bracket 516 has a jackscrew guide hole 518. The jackscrew 414 (FIG. 4) is inserted into the jackscrew guide hole 518 and the jackscrew 414 is attached so that it can rotate within the jackscrew guide hole 518. However, the jackscrew 414 is secured by the inner walls of the hole 518 such that it cannot move in a lateral motion up, down, left or right. Thus, jackscrew guide hole 518 forms a bearing for rotation of jackscrew 414. Note that a ball bearing or other bearing known or future-developed may be used.

The left arm-mounting bracket 504 and the right arm-mounting bracket 506 comprise sloped edges 702 and 704. Each of the sloped edges 702 and 704 comprise a perturbation 706 and 708 in the grade of the sloped edges 702 and 704. The perturbations 706 and 708 are configured to receive the pad pivot mechanisms 402 (FIG. 4) when the left main arm 404 and the right main arm 428 are in a completely disengaged position, i.e., the threaded nut 412 is in its closest proximity to the motor 426, as depicted herein with reference to FIG. 8 and FIG. 13.

Figure 6:
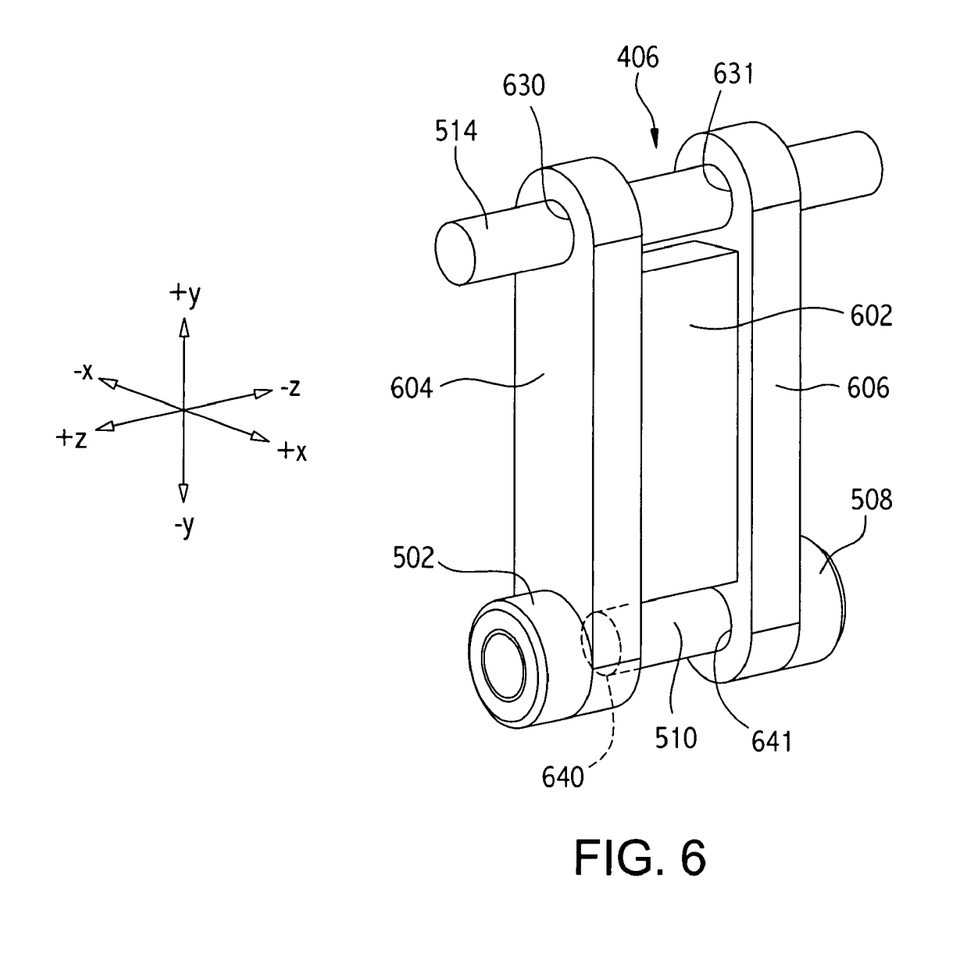
FIG. 6 depicts a perspective view of a pressure distribution mechanism of the mounting bracket depicted in FIG. 5.

FIG. 6 depicts the pressure distribution mechanism 406. The pressure distribution mechanism 406 distributes pressure that is applied when the boat pad 304 (FIG. 3) contacts the boat transom 302 (FIG. 3) as the boat 300 (FIG. 3) is secured to the trailer 100 (FIG. 1).

The pressure distribution mechanism 406 comprises a left pressure arm 604 and a right pressure arm 606. The left pressure arm 604 and the right pressure arm 606 are rigidly attached to the stability block 602. The left pressure arm 604 and the right pressure arm 606 may be attached to the stability block 602 via, for example, welding.

The pressure distribution mechanism 406 further comprises the pressure mechanism shaft 514, which is rotatably inserted into holes 630 and 631 located in one end of the left pressure arm 604 and right pressure arm 606. The shaft 514 is inserted so that the shaft 514 can rotate within the holes 630 and 631 and still be retained by the pressure distribution mechanism 406.

The pressure distribution mechanism 406 further comprises a pressure wheel shaft 510. The pressure wheel shaft 510 is inserted into holes 640 and 641 in another end of the left pressure arm 604 and the right pressure arm 606 opposing the end receiving the pressure mechanism shaft 514.

The pressure wheel shaft 510 further comprises the left pressure wheel 502 and the right pressure wheel 508. The left pressure wheel 502 and the right pressure wheel 508 are attached to the pressure wheel shaft 510 such that the pressure wheel shaft 510 can rotate freely.

When the threaded nut 412 (FIG. 4) rotates about the jackscrew 414 (FIG. 4) thereby moving the left main arm 404 (FIG. 4) and the right main arm 428 (FIG. 4) in a positive y-direction, the left main arm 404 and the right main arm 428 contact the left pressure wheel 502 and the right pressure wheel 508, respectively. Further, as the left main arm 404 and the right main arm 428 continue to move toward the engaged position, pressure applied to the left main arm 404 and the right main arm 428 while the docking device 108 (FIG. 1) is engaging is applied to the left pressure wheel 502 and the right pressure wheel 508.

Figure 7:
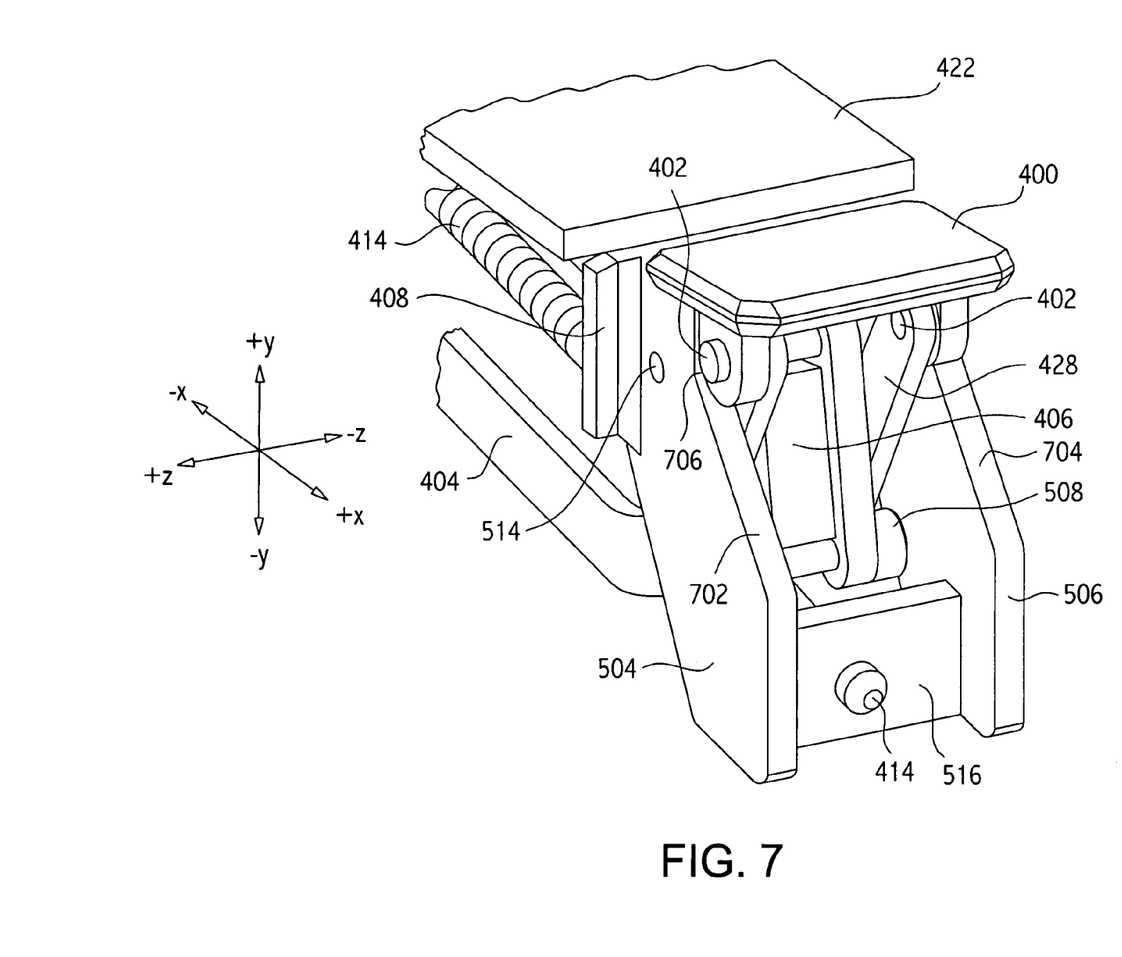
FIG. 7 depicts a perspective end view of the docking device of FIG. 1.

FIG. 7 depicts the docking device 108 in the disengaged position as described hereinabove. As indicated, the left arm-mounting bracket 504 comprises a sloped edge 702. As described herein, the sloped edge 702 comprises at least one perturbation 706. The perturbations 706 is located on the sloped edge 702 so as to receive the pad pivot mechanism 402. In this regard, the perturbation 706 receives the pad pivot mechanism 402 and provides support on which the boat pad 304 sits while in a retracted position.

As the jackscrew 414 rotates clockwise, the threaded nut 412 (FIG. 4) attached to the left main arm 404 and the right main arm 428 moves linearly along the jackscrew 414 in the positive x-direction, as described hereinabove. Movement of the threaded nut 412 (FIG. 4) in such a direction causes the left main arm 404 and the right main arm 428 to move in the positive x-direction and the positive y-direction (FIG. 7). As the left main arm 404 and the right main arm 428 move in the positive x-direction, they contact the left pressure wheel 502 (FIG. 6) and the right pressure wheel 508, thereby pushing the pressure distribution mechanism 406 in the positive x-direction and as it rotates in the positive y-direction. As noted herein, the pressure distribution mechanism 406 is pivotally mounted to the left arm mounting bracket 504 and the right arm-mounting bracket 506. Therefore, as the left main arm 404 and the right main arm 428 push against the left pressure wheel 502 (FIG. 6) and the right pressure wheel 506, the pressure distribution mechanism 406 moves in positive x-direction and as it rotates it moves in the positive y-direction. Consequently, when pressure is applied to the left main arm 404 and the right main arm 428, pressure is applied to the pressure distribution mechanism 406.

Note that while the view in FIG. 7 does not show the left main arm 404 as it pushes and slides on top of the left pressure wheel 502, the left pressure wheel 502 is identical in structure and operation as the right pressure wheel 508 as well as the left and right pressure arms 604 and 606.

FIGS. 8-11 sequentially depict in more detail the docking device 108 moving into the engaged position, as described herein. Because a side view is shown, only the operation of the left main arm 404 is described. Therefore, operation of the docking device 108 as the boat pad 304 is placed into the engaged position is now described with reference to the left main arm 404. However, operation relative to the right main arm 428 is identical to that of the left main arm 404.

Figure 8:
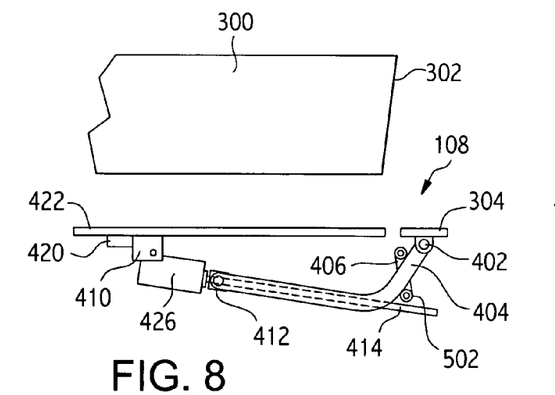
FIGS. 8-11 depict sequential side views of the docking device depicted in FIG. 1 as it moves to an engaged position.

In this regard, FIG. 8 depicts the docking device 108 in the disengaged position, as described hereinabove. When the docking device 108 is in the disengaged position, the boat pad 304 rests substantially aligned with the mounting pad 422. Such alignment allows a boat 300 (FIG. 3) to be driven over the docking device 108 in a position to be loaded onto the trailer 100 (FIGS. 1 and 2).

Furthermore, when the docking device 108 is in the disengaged position, the left main arm 404 rests on the left pressure wheel 502, and the threaded nut 412 is within close proximity to the motor 426. Therefore, the left main arm 404 is retracted in toward the motor 426, such that the left main arm 404 are substantially adjacent to the jackscrew 414. Note that the left main arm 404 is attached to the threaded nut 412. Therefore, when the threaded nut 412 moves in a positive x-direction, the left main arm 404 moves in a positive x-direction. Further, as the left main arm 404 moves in the positive x-direction, its substantially constant contact with the pressure wheel 404 pushes the left main arm in a positive y-direction, so that the boat pad 304 moves toward the boat transom 302.

When the motor is activated so as to engage the docking device 108, as described hereinabove with reference to FIGS. 1 and 2, the jackscrew 414 turns in a clockwise manner. As the jackscrew 414 turns, the rotational motion of the jackscrew 414 moves the threaded nut 412 linearly along the jackscrew 414 in the positive x-direction. Therefore, the left main arm 404 begins to extend outwardly in a positive x-direction by virtue of the linear motion of the threaded nut 412 and in the positive y-direction by pressure applied by the left pressure wheel 502.

Figure 9:
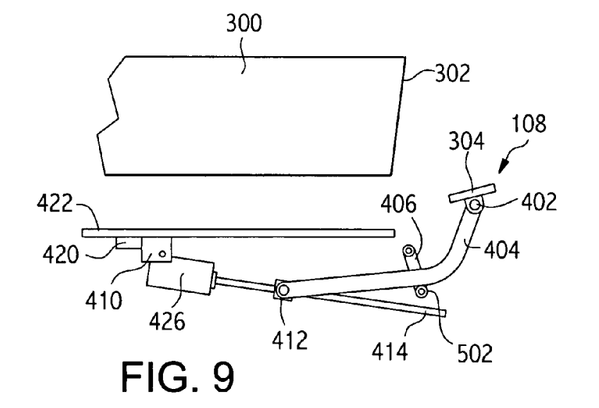

FIG. 9 the docking device 108 of FIG. 8 once the threaded nut 412 has moved in the positive x-direction and the left main arm 404 has moved in the positive y-direction toward the boat transom 302. In this regard, as the threaded nut 412 moves linearly along the jackscrew 414 in the positive x-direction, the left main arm 404 moves with in the positive x-direction. However, due to pressure applied by the left pressure wheel 502, the left main arm 404 moves in a positive y-direction toward the boat transom 302. Consequently, the left main arm 404 rises on the pressure wheel 502, which causes the boat pad 304 to rise toward the boat transom 302. Note that the L-shape of the left main arm 404 results in the boat pad 304 moving toward the boat transom 302 in a negative x-direction as the left main arm 404 moves in the positive y-direction.

Figure 10:
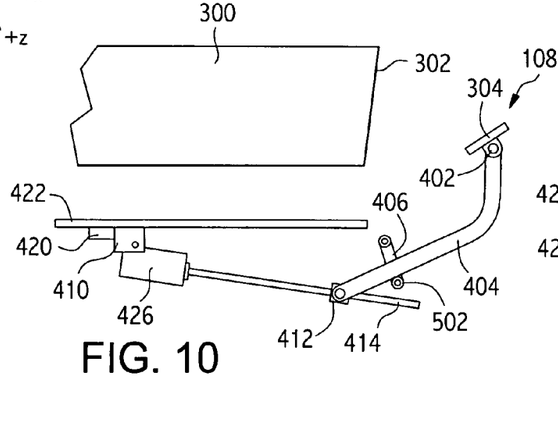

FIG. 10 depicts the docking device 108 of FIG. 9 once the jackscrew 414 has further turned driving the threaded nut 412 linearly in the positive x-direction. In this regard, the left main arm 404 continues to move in the positive x-direction, and due to the pressure applied by the left pressure wheel 502, the boat pad 304 continues to move in a positive y-direction and a negative x-direction toward the boat transom 302.

Figure 11:
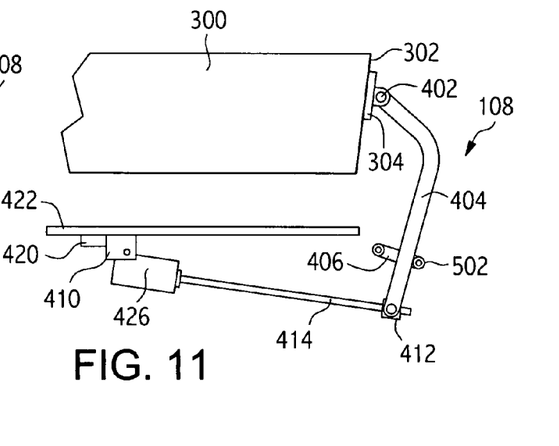

FIG. 11 depicts the docking device 108 in the engaged position, as described hereinabove with reference to FIGS. 1 and 2. In this regard, the threaded nut 412 is at a position removed from the motor 426, the left pressure wheel 502 is contacting the left main arm 404, and the boat pad 304 is contacting the transom 302 of the boat 300. Note that the pressure distribution mechanism 406 is extended in the positive x-direction, and pressure applied to the boat pad 304 by any boat movement is transferred via the left main arm 404 to the pressure distribution mechanism 406 via the contact left pressure wheel 502. In this regard, pressure is applied to the left pressure wheel 502 in the positive x-direction via pressure applied by the boat transom 302 in the negative x-direction as a result of the moment in the left main arm 404. Notably, as the boat pad 304 contacts the boat transom 302, the pressure distribution mechanism 406 is forced in the positive y-direction to maintain a tangent position with the left main arm 404 as the pressure increases.

Further, the pressure applied by the pressure distribution mechanism 406 increases the moment arm on the left main arm 404. Therefore, the pressure of the boat pad 304 on the boat transom 302 increases.

As the docking device 108 is moving into the engaged position and the pressure begins to increase in the left main arm 404, the pressure sensor 420 monitors the pressure increase. In this regard, the pressure sensor detects the pressure as it increases and transmits a value indicative of the pressure to the controller 102. Thus, when the controller 102 detects a predetermined maximum pressure value from the pressure sensor 420, the controller 102 transmits a deactivation signal to the motor 426 via a wire (not shown) contained within the wiring harness 104 (FIGS. 1 and 2).

Once the motor 426 is deactivated, the boat 300 is secured to the trailer 100 by the pressure of the boat pad 304 on the boat transom 302. In this regard, the threaded nut 412 no longer moves, however, the threaded nature of the nut coupled to the jackscrew 412 ensures that the boat pad 304 remains in contact with the boat until the motor 426 is activated by the controller 102 again.

In one embodiment, the pressure sensor 420 continues to monitor the pressure applied to the left main arm 404. In this regard, as the boat 300 remains idle in a position aligned with the trailer 100, the water and/or other external forces may cause the boat 300 to push back on or move away from the left main arm 404. Further, as the trailer 100 (FIG. 1) is pulled out of the water and the boat 300 settles down on the running board 306 (FIG. 3), the boat may also push back on or move away from the left main arm 404.

Therefore, the controller 102 compares the value indicative of the pressure being applied to the left main arm 404 to the pressure threshold value. If the controller 102 determines that the value indicative of the pressure applied to the left main arm 404 has increased above a predetermined threshold pressure value, then the controller 102 transmits a signal to the motor 426 that activates the motor 426 in a counter-clockwise direction, thereby initiating counter-clockwise rotation of the jackscrew 414, which causes the threaded nut 412 to move in the negative x-direction. Thus, the left main arm 404 moves in the negative y-direction causing the boat pad to move in the positive x-direction, which reduces the pressure being applied by the boat transom 302 to the boat pad 304. Consequently, substantially constant pressure will continue to be applied to the boat transom 302 by boat pad 304.

Likewise, if the controller 102 determines that the value indicative of the pressure applied to the left main arm 404 decreases below the predetermined threshold pressure value, then the controller 102 transmits a signal to the motor 426 that activates the motor 426 in a clockwise direction, thereby initiating clockwise rotation of the jackscrew 414, which causes the threaded nut 412 to move in the positive x-direction. Thus, the left main arm 404 moves in the positive y-direction causing the boat pad to move in the negative x-direction, which increases the pressure being applied by the boat transom 302 to the boat pad 304. As noted herein, substantially constant pressure will continue to be applied to the boat transom 302 by boat pad 304.

Notably, when a boat is being delivered to a body of water, the boat 300 is initially retained by the docking devices 108, and to unload the boat 300, the docking devices 108 are lowered. In this regard, when the boat pad 304 retracts to the disengaged position, the pressure sensor detects the pressure on the left main arm 404. When the pressure detected indicates that the boat pad 304 is at rest in the position shown in FIG. 8, the controller 102 transmits a signal to the motor 426 that deactivates the motor 426.

FIGS. 12-15 sequentially depict a perspective view of the docking device 108, as the docking device 108 is being engaged. As described herein with reference to FIGS. 8-10, the motor 426 is activated by a signal from the controller 102. The motor 426 may be activated in a clockwise or counter-clockwise direction depending upon the current received from the controller 102.

Such activation may be initiated by a user (not shown) transmitting a signal indicative of engagement to the controller 102 via a remote hand-held device or via manual selection, as described further herein with reference to FIG. 16. Further, the controller 102 may activate the motor 426 based upon pressure values received from the pressure sensor 420. In this regard, if the pressure detected is above an threshold pressure value, the controller 102 activates the motor 426 in a clockwise direction thereby releasing pressure from the boat transom 302, as described hereinabove, or if the pressure detected is below an threshold pressure value, the controller activates the motor 426 in a counter clockwise direction thereby increasing pressure applied to the boat transom 302, as described hereinabove.

Figure 12:
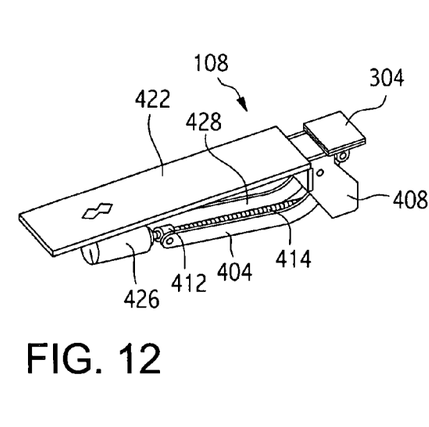
FIGS. 12-15 depict sequential perspective views of the docking device depicted in FIG. 1 as it moves to an engaged position.

FIG. 12 depicts the docking device 108 in the disengaged position, as described hereinabove. When the docking device 108 is in the disengaged position, the boat pad 304 rests substantially in alignment with the mounting pad 422.

Furthermore, when the docking device 108 is in the disengaged position, the left main arm 404 rests on the left pressure wheel 502, and the threaded nut 412 is in its closest position to the motor 426. Therefore, the left main arm 404 drawn in toward the motor 426, such that the left main arm 404 is substantially parallel with the jackscrew 414. Note that the left main arm 404 is attached to the nut 412 via an attachment mechanism, such as, for example, a screw.

With respect to FIG. 13, when the motor 426 is activated, as described hereinabove, the motor 426 rotates the jackscrew 414. As described hereinabove, the jackscrew 414 is threadedly coupled to the threaded nut 412. Therefore, when the jackscrew 414 rotates, the threaded nut 412 rotates about the jackscrew 414 causing the threaded nut 412 to move linearly in a positive x-direction along the jackscrew 414 away from the motor 426.

When the threaded nut 412 moves in the positive x-direction, the left main arm 404 and the right main arm 428 move in the positive x-direction. Therefore, the left main arm 404 and the right main arm 428 begin to extend outwardly in the positive x-direction by virtue of the linear motion of the threaded nut 412. Additionally, because the left main arm 404 and the right main arm 428 are in substantially constant contact with the left pressure wheel 502 (FIG. 6) and the right pressure wheel 508 (FIG. 6), as the main arms 404 and 428 move in the positive x-direction, the pressure wheels 502(FIG. 6) and 508 (FIG. 6) apply pressure to the arms 404 and 428 pushing the arms 404 and 428 in a positive y-direction, as well. Therefore, the boat pad 304 is no longer aligned with the mounting pad 422, but instead is situated above the mounting pad 422.

Figure 13:
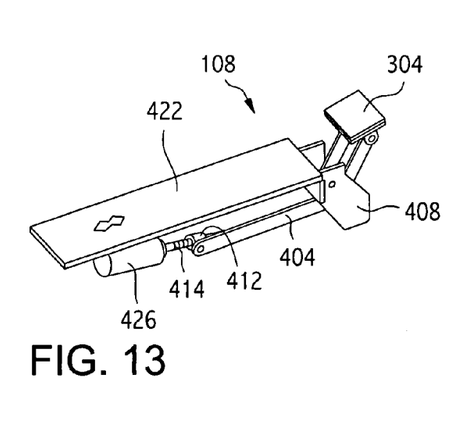
Figure 14:
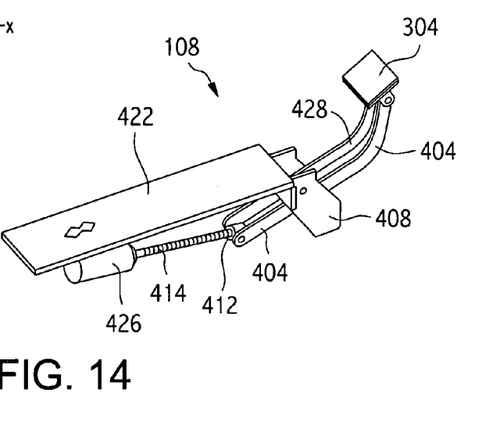

FIG. 14 depicts movement of the docking device 108 of FIG. 13 once the threaded nut 412 has moved farther along linearly in the positive x-direction. In this regard, as the threaded nut 412 moves down jackscrew 414, the left main arm 404 and the right main arm 428 move in the positive x-direction, and the pressure wheels 502 (FIG. 6) and 508 (FIG. 6) apply pressure to the arms 404 and 428 thereby pushing the arms 404 and 428 in a positive y-direction. This, in turn, causes the boat pad to move in the positive y-direction, and by nature of the L-shaped arms 404 and 428, the boat pad 304 begins to move in the negative x-direction. In this regard, as the arm 404 and 428 rise on the pressure wheel 502 (FIG. 6) and 508 (FIG. 6), the boat pad 304 moves toward the boat transom 302.

Figure 15:
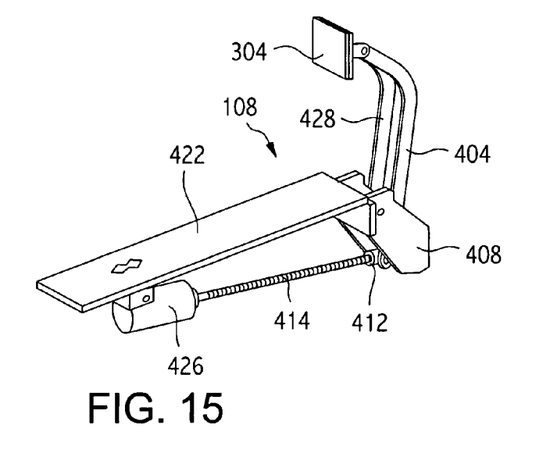

FIG. 15 depicts the docking device 108 in the engaged position, as described hereinabove with reference to FIG. 11. In this regard, the threaded nut 412 is located along the jackscrew 414 at its farthest point from the motor 426. Further, the boat pad 304 is in contact with the boat transom 302 (FIG. 3) when the docking device 108 is in the position shown in FIG. 15.

FIG. 16 is a block diagram depicting an exemplary controller 102 (FIGS. 1 and 2). The controller 102 comprises a microprocessor 1628 that interfaces with and controls a plurality of devices. In this regard, the controller 102 comprises bi-directional motor drivers 1606 and 1616, motor sensor currents 1620 and 1622, and a sensor driver 1610. In addition, the controller 102 comprises an radio frequency (RF) interface 1626, status indicators 1624, and a manual control interface 1604. Note that the controller 102 illustrated in FIG. 16 is configured to control two docking devices 108, including a docking device 108 on each side of the trailer 100. Further note that other numbers of docking devices are possible in other embodiments.

Generally, the controller 102 executes commands to raise or lower one and/or each of the docking devices 108.

Further, the controller 102 receives constant data feedback indicative of the pressure characteristics related to actuation of the docking devices 108. In this regard, the controller 102 automatically adjusts the docking devices 108 such that the pressure applied to the boat 300 (FIG.) remains substantially constant while in the engaged position.

The controller 102 can be implemented in software, hardware, or any combination thereof. Note that the controller 102, when implemented in software, can be stored and transported on any computer-readable medium for use by or in connection with an instruction execution system, such as a computer-based system, processor-containing system, or other system that can fetch the instructions from the instruction execution system and execute the instructions. In the context of this document, a "computer-readable medium" can be any means that can contain, store, communicate, propagate, or transport the program for use by or in connection with the instruction execution system. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control logic 1414 may be magnetically stored and transported on a conventional portable computer diskette or compact disk read-only memory (CDROM).

In one embodiment of the controller 102, the radio frequency (RF) interface 1626 receives a signal from a handheld remote device 1630, e.g., a keyless entry device for an automobile. Such signals may include a signal to engage the docking devices 108 or disengage the docking devices 108, for example. If the signal indicates to engage the docking device 108, the microprocessor 1628 processes the received signal and initiates the bi-directional motor driver 1606 via a connection 1633 that signals the motor to raise the docking device 108. In this regard, the bi-directional motor driver 1606 transmits a signal that supplies a positive electrical current to the motor 426. Upon receipt, the motor 426 begins to rotate the jackscrew 414 (FIG. 4) in a clockwise direction, as described hereinabove, which moves the docking device 108 toward the engaged position.

If the signal indicates to lower the docking device 108, the microprocessor 1628 processes the received signal and initiates the bi-directional motor driver 1606 via a connection 1634 that signals the motor to lower the docking device 108. In this regard, the bi-directional motor driver 1606 transmits a signal that supplies a negative electrical current to the motor 426. Upon receipt, the motor 426 begins to rotate the jackscrew 414 (FIG. 4) in a counter-clockwise direction, as described hereinabove, which moves the docking device 108 toward the disengaged position.

In addition to receiving a radio frequency (RF) signal from a hand-held remote device 1630 for engaging and disengaging the docking devices 108, the manual control 1604 may be used by a user (not shown) to engage and/or disengage the docking devices 108. Such a control may comprise an engage pushbutton 1631, or a disengage pushbutton 1632. Therefore, if a user (not shown) selects the engage pushbutton 1631, the microprocessor behaves accordingly, as described hereinabove with reference to receipt of an RF signal indicating engagement. Likewise, if a user (not shown) selects the disengage pushbutton 1632, the microprocessor behaves accordingly, as described hereinabove with reference to receipt of an RF signal indicating disengagement.

The status indicators 1624 may comprise lights, for example, that indicate the presence of power and current status of the commands being executed. For example, the status indicators 1624 may comprise a power indicator 1635, an engaged indicator 1636, and a disengaged indicator 1637. Thus, if power is being provided to the controller 102, then the indicator 1635 may emit a green light. If the docking devices 108 are in the engaged position, then the indicator 1636 may emit a red light, and if they are disengaged, the indicator 1637 may emit a red light.

The microprocessor 1628 further interfaces with the bi-directional motor current sensors 1620 and 1622. The motor current sensors 1620 and 1622 receive data from each of the motors 426 that indicates whether the motor is off, actuating in a clockwise direction, or actuating in a counter-clockwise direction.

Furthermore, the microprocessor 1628 further interfaces with the sensor driver 1610. The sensor driver 1610 can turn the pressure sensor 420 (FIG. 4) on or off depending upon the application.

Additionally, the microprocessor 1628 interfaces with the motor current sensors 1620 and 1622. The motor current sensors 1620 and 1622 receive data from each of the motors 426 that indicates whether the motor is off, actuating in a clockwise direction, or actuating in a counter-clockwise direction. In this regard, the microprocessor can simultaneously control the actions of two motors and sense two pressure sensors.

The controller 102 may also perform internal diagnostics of the motors 426 via the motor current sensors 1620 and 1622.

Figure 17:
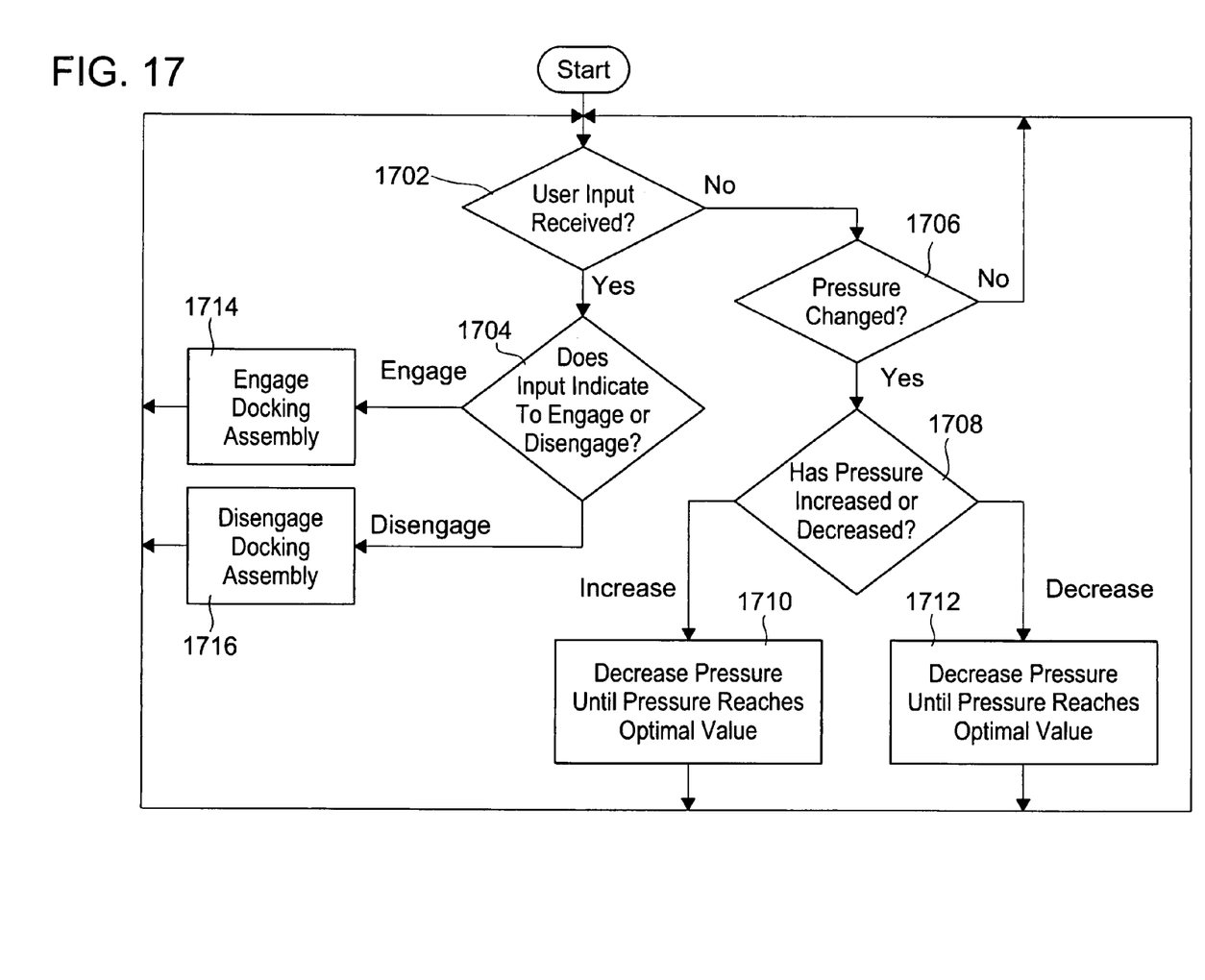
FIG. 17 is a flowchart depicting exemplary architecture and functionality of the docking device depicted in FIG. 1.

FIG. 17 is a flowchart that depicts an exemplary architecture and functionality of the controller 102.

The controller 102 determines if a user input is received in step 1702. If a user input is not received, then the controller 102 determines whether the pressure has changed in step 1706. If the pressure has not changed, the controller 102 checks to see if a user input has been received in step 1702, and continues this process until the user input is received in step 1702 or the pressure changes in step 1706.

If user input is received in step 1702, then the controller 102 determines if the input indicates a desire to engage the docking device 108 (FIG. 2) or disengage the docking device 108 (FIG. 1). If the user input indicates to engage the docking device 108, the controller 102 engages the docking device 108. If the user input indicates to disengage, the controller 102 disengages the docking device 108.

Further, if the pressure changes in step 1706, then the controller 102 determines if the pressure being detected increased or decreased, in step 1708. If the pressure increases, the controller 102 decreases the pressure that is being applied to the boat until the pressure reaches an threshold value in step 1710. If the pressure decreases, the controller 102 increases the pressure that is being applied to the boat until the pressure reaches an threshold value in step 1712.

The invention claimed is:

1. A system comprising:
   a boat trailer;
   a mechanical arm coupled to the boat trailer on a rear of the trailer;
   logic configured to actuate the mechanical arm based upon a user input, such that the mechanical arm applies a pressure to a transom of a boat when the boat is positioned for loading onto the trailer.

2. The system of claim 1, further comprising a pressure sensor configured to detect the pressure applied to the boat.

3. The system of claim 2, wherein the pressure sensor is configured to transmit a value indicative of the pressure detected.

4. The system of claim 3, wherein the logic is configured to receive the value indicative of the pressure detected and actuate the mechanical arm based upon the value.

5. The system of claim 4, wherein the logic is configured to compare the value with a predetermined a threshold value.

6. The system of claim 5, wherein the logic is configured to actuate the mechanical arm in a first direction if the value exceeds the threshold value, such that the pressure applied to the boat by the mechanical arm is decreased.

7. The system of claim 6, wherein the logic is configured to actuate the mechanical arm in a second direction if the value falls below the threshold value, such that the pressure applied to the boat by the mechanical arm is increased.

8. The system of claim 1, further comprising a wireless interface configured to receive activation signals from a remote device.

9. The system of claim 1, further comprising a manual interface configured to receive activation signals.

10. The system of claim 9, wherein the logic is further configured to receive the user input via the manual interface.

11. A method for loading a boat onto a trailer, comprising the steps of;
   driving the boat onto the trailer; and
   actuating a mechanical arm located on a rear of the trailer in response to a user input, the mechanical arm applying pressure to a transom of the boat.

12. The method of claim 11, further comprising the step of detecting the pressure applied to the boat.

13. The method of claim 12, further comprising the step of transmitting a value indicative of the pressure detected.

14. The method of claim 13, further comprising the steps of receiving the value indicative of the pressure detected and actuating the mechanical arm based upon the value.

15. The method of claim 14, further comprising the step of comparing the value with a predetermined threshold value.

16. The method of claim 15, further comprising the step of actuating the mechanical arm in a first direction if the value exceeds the threshold value, such that the pressure applied to the boat by the mechanical arm is decreased.

17. The method of claim 16, further comprising the step of actuating the mechanical arm in a second direction if the value falls below the threshold pressure value, such that the pressure applied to the boat by the mechanical arm is increase.

18. The method of claim 11, further comprising the step of receiving the user input from a remote device.

19. The method of claim 11, further comprising the step of receiving the user input via a manual interface.

* * * * *